US008914326B2

(12) United States Patent
Li et al.

(10) Patent No.: US 8,914,326 B2
(45) Date of Patent: Dec. 16, 2014

(54) METHOD FOR PRESENTING FILES UPON SWITCHING BETWEEN SYSTEM STATES AND PORTABLE TERMINAL

(75) Inventors: Bin Li, Beijing (CN); Sheng Wang, Beijing (CN); Hao Chen, Beijing (CN)

(73) Assignee: Lenovo (Beijing) Limited Beijing Lenovo Software Ltd., Beijing (CN)

( * ) Notice: Subject to any disclaimer, the term of this patent is extended or adjusted under 35 U.S.C. 154(b) by 30 days.

(21) Appl. No.: 13/509,992

(22) PCT Filed: Nov. 9, 2010

(86) PCT No.: PCT/CN2010/001796
§ 371 (c)(1),
(2), (4) Date: May 15, 2012

(87) PCT Pub. No.: WO2011/057476
PCT Pub. Date: May 19, 2011

(65) Prior Publication Data
US 2012/0226665 A1   Sep. 6, 2012

(30) Foreign Application Priority Data

Nov. 16, 2009   (CN) .......................... 2009 1 0237702

(51) Int. Cl.
*G06F 17/30* (2006.01)
*H04L 29/08* (2006.01)
*G06F 11/14* (2006.01)

(52) U.S. Cl.
CPC .......... *H04L 67/142* (2013.01); *G06F 11/1458* (2013.01); *G06F 17/30017* (2013.01)
USPC ............................. 707/650; 707/620; 707/617

(58) Field of Classification Search
CPC .......... G06F 11/1458; G06F 17/30017; G06F 11/1461
USPC ........................................ 707/650, 620, 617
See application file for complete search history.

(56) References Cited

U.S. PATENT DOCUMENTS 4,747,040 A * 5/1988 Blanset et al. ................ 718/108
5,063,500 A * 11/1991 Shorter ......................... 709/226

(Continued)

FOREIGN PATENT DOCUMENTS

CN        1952891 A     4/2007
CN       101171564 A    4/2008

OTHER PUBLICATIONS

International Search Report of the State Intellectual Property Office, the P.R. China, in International Application No. PCT/SN2010/001796, dated Jan. 6, 2011.

*Primary Examiner* — Shahid Alam
*Assistant Examiner* — Nargis Sultana
(74) *Attorney, Agent, or Firm* — Kinney & Lange, P.A.

(57) ABSTRACT

Methods for presenting files upon switching between system states and portable terminals are provided. The portable terminal comprising a first system platform and a second system platform, a state in which the presentation of the file is controlled by the first system platform being a first state, and a state in which the presentation of the file is controlled by the second system platform being a second state. The method comprising: detecting, by the first system platform in the first state, that a status of the file satisfies a preset condition; backuping, by to the first system platform, the file for the second system platform; and switching to the second state, and continuing, by the second system platform, the presentation of the file based on the backup file. With the portable terminal of hybrid system architecture according to embodiments of the present invention, if the system state is switched while a file is being played, the switched-to system can continue presenting the file based on the backup file, according to the presentation progress before the system switching. In this way, it is possible to achieve a seamless presentation of the file before and after the switching, and thus improve user's experience.

13 Claims, 4 Drawing Sheets

(56) References Cited

U.S. PATENT DOCUMENTS

| | | | |
|---|---|---|---|
| 5,315,533 A * | 5/1994 | Stich et al. | 700/298 |
| 5,412,772 A * | 5/1995 | Monson | 715/746 |
| 5,483,647 A * | 1/1996 | Yu et al. | 713/100 |
| 5,568,603 A * | 10/1996 | Chen et al. | 715/784 |
| 5,996,015 A * | 11/1999 | Day et al. | 709/226 |
| 6,000,000 A * | 12/1999 | Hawkins et al. | 707/610 |
| 6,372,974 B1 * | 4/2002 | Gross et al. | 84/609 |
| 6,611,850 B1 * | 8/2003 | Shen | 707/610 |
| 6,961,870 B2 * | 11/2005 | Chiu et al. | 714/11 |
| 7,356,677 B1 * | 4/2008 | Rafizadeh | 713/1 |
| 7,849,160 B2 * | 12/2010 | Hayward | 709/219 |
| 7,987,158 B2 * | 7/2011 | Boyd et al. | 707/649 |
| 7,987,496 B2 * | 7/2011 | Bryce et al. | 726/1 |
| 8,284,424 B2 * | 10/2012 | Shoya et al. | 358/1.15 |
| 2003/0115409 A1 * | 6/2003 | Yamada et al. | 711/113 |
| 2004/0060050 A1 * | 3/2004 | Bieringer | 718/102 |
| 2005/0066207 A1 * | 3/2005 | Fleck et al. | 713/320 |
| 2006/0059172 A1 * | 3/2006 | Devarakonda | 707/100 |
| 2006/0255964 A1 * | 11/2006 | Wong et al. | 340/855.8 |
| 2007/0011615 A1 * | 1/2007 | Ikeda | 715/730 |
| 2007/0136650 A1 * | 6/2007 | Liu et al. | 715/500 |
| 2007/0180314 A1 * | 8/2007 | Kawashima et al. | 714/15 |
| 2008/0082845 A1 * | 4/2008 | Morisawa | 713/323 |
| 2009/0199193 A1 * | 8/2009 | Jackson | 718/104 |
| 2011/0055536 A1 * | 3/2011 | Banga et al. | 713/2 |
| 2012/0151265 A1 * | 6/2012 | Bender et al. | 714/37 |
| 2012/0240112 A1 * | 9/2012 | Nishiguchi et al. | 718/1 |

* cited by examiner

METHOD FOR PRESENTING FILES UPON SWITCHING BETWEEN SYSTEM STATES AND PORTABLE TERMINAL

FIELD OF THE INVENTION

The present invention relates to the field of communication technology, and more particularly, to a method for presenting a file upon switching between system states and a portable terminal.

BACKGROUND OF THE INVENTION

A terminal of hybrid system architecture is, for example, a Personal Computer (PC) in which at least one additional system is embedded into a conventional PC having only one system. The different systems can work cooperatively to achieve their respective advantages. Currently, a typical PC of hybrid system architecture usually has a master system (e.g., Vista) and a slave system (e.g., WinCE) integrated therein. The master system and the slave system can share a keyboard, a network adapter, a display screen, a memory device, an audio unit and the like. During operation of the PC of hybrid system architecture, switching may be made between the master system and the slave system if necessary.

The inventors have found that, in the existing PC of hybrid system architecture, if switching to the slave system is made while the master system is playing a multi-media file, the salve system may not be able to continue playing the multi-media file after the switching, which degrades the user experience of the portable terminal.

SUMMARY

An object of the embodiments of the present application is to provide a method for presenting files upon switching between system states and a portable terminal, which can solve the problem that, when a portable terminal of hybrid system architecture is switched between different systems, the switched-to system may not continue presentation of a file which was previously presented by a different system.

In order to solve at least the above problem, the following solutions are provided according to the embodiments of the present application.

A method for presenting a file upon switching between system states in a portable terminal, the portable terminal comprising a first system platform and a second system platform, a state in which the presentation of the file is controlled by the first system platform being a first state, and a state in which the presentation of the file is controlled by the second system platform being a second state, the method comprising: detecting, by the first system platform in the first state, that a status of the file satisfies a preset condition; backuping, by the first system platform, the file for the second system platform; and switching to the second state, and continuing, by the second system platform, the presentation of the file based on the backup file.

A portable terminal, comprising a first system platform and a second system platform, wherein the first system platform comprises: a first presentation unit configured to present a file in a first state in which the presentation of the file is controlled by first system platform; a detection unit configured to detect whether a status of the file satisfies a preset condition; and a backup unit configured to backup the file for the second system platform, the second system platform comprises a second presentation unit configured to continue the presentation of the file based on the backup file, upon switching to a second state in which the presentation of the file is controlled by the second system platform.

According to the embodiments of the present application that, in the first state in which the file is presented by the first system platform, if it is detected that the status of the file satisfies a preset condition, the first system platform backups the file for the second system platform. When the portable terminal is switched to the second state in which the file is presented by the second system platform, the second system platform continues presenting the file based on the backup file. With the portable terminal of hybrid system architecture according to the embodiments of the present invention, if the system platform is switched while a file is being played, the switched-to system platform can continue presenting the file based on the backup file, according to the presentation progress before the system switching. In this way, a seamless presentation of the file before and after the system switching can be achieved, thereby improving user's experience of using the portable terminal.

DETAILED DESCRIPTION OF PREFERRED EMBODIMENTS

Various embodiments according to the present application will be described in the following, some of which relate to a method for presenting a file upon switching between system states and the others relate to a portable terminal.

In order to facilitate those skilled in the art to better understand the solutions according to embodiments of the present application, the solutions will be further detailed with reference to the figures, such that the above objects, features and advantages of the present application can become more apparent.

A portable terminal according to an embodiment of the present application is a portable terminal of hybrid system architecture which typically includes a first system platform and a second system platform. The power consumption of the first system platform may be higher than that of the second system platform. For example, the first system platform can be based on an X86 processor which typically has characteristics of high speed and high power consumption, and is a processor capable of supporting a general Windows operating system and handling processing-capability-demanding tasks. The second system platform can be based on an ARM processor which typically has characteristics of low speed, low power consumption and thus long standby time, and is capable of supporting less complicated applications.

In the portable terminal according to an embodiment of the present invention, e.g., an electronic device having a form of notebook computer, the first system platform can be provided at the main body part of the device where a keyboard is located, while the second system platform can be provided at a display screen part. When the main body part and the display screen part are physically connected, the first and the second system platforms can exchange state switching information via an interface between these parts. When the main body part and the display screen part are physically separated, the first and the second system platforms perform their respective functions in a separate state. For example, the main body part where the first system platform is located can function as a server while the display screen part where the second system platform is located can function as a touch pad device.

For the purpose of illustration of a file presentation process, two states are defined for the portable terminal according to an embodiment of the present application, that is, a first state in which the file presentation is controlled by the first system platform, and a second state in which the file presentation is controlled by the second system platform.

Figure 1:
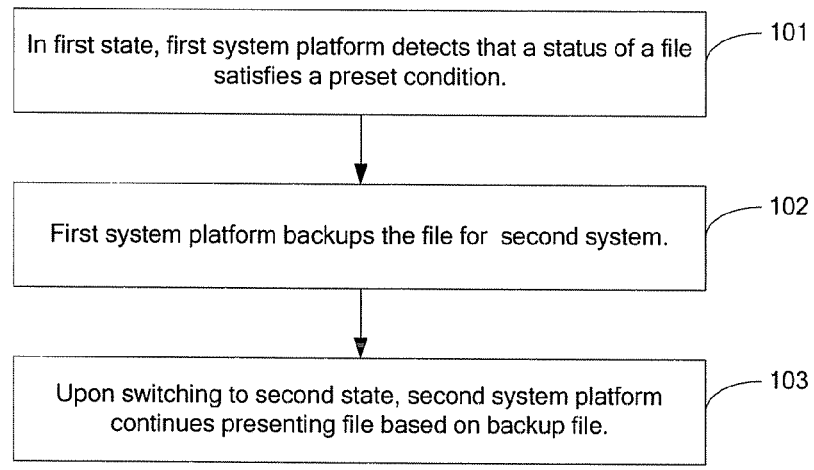
FIG. 1 is a flowchart illustrating a first embodiment of a method for presenting a file upon switching between system states according to the present application.

Reference is now made to FIG. 1, which is a flowchart illustrating a first embodiment of the method for presenting a file upon switching between system states according to the present application.

At step 101, the first system platform detects in the first state that a status of a file satisfies a preset condition.

In the first state, the first system platform presents a file which can be, for example, an audio file, a video file, a document file or the like.

According to an embodiment of the present application, the preset condition can be a condition that the time for presenting the file reaches a preset presentation time. That is, the presentation time can be set in advance, and the condition is satisfied when the time for presenting the file reaches the preset presentation time. In this case, satisfaction of the preset condition can be determined based on playing time for a media file, such as an audio file or a video file as described above, or based on display time for a document file. For example, for an audio file, it may be set that the preset condition is satisfied if progress of playing the file reaches 10% of the whole process length. Alternatively, for a document file (e.g., a text document or an image document), it may be set that the preset condition is satisfied if opening the file takes more than 5 minutes.

In addition, a backup label can be preset for the file. In this case, the preset condition is satisfied if it is detected that the file has a backup label.

At step 102, the first system platform backups the file for the second system platform.

When the first system platform is provided with a first storage unit and the second system platform is provided with a second storage unit, the first system platform can backup the file from the first storage unit to the second storage unit.

When the first system platform is provided with a first storage unit and there is a common memory device, such as a storage disk connected via an USB interface, shared between the first and the second system platforms, the first system platform can backup the file from the first storage unit to the common storage device.

At step 103, after switching to the second state, the second system platform presents the file based on the backup file. Then, the flow of the method ends.

Herein, switching to the second state may be made upon detecting a state switching signal. For example, such a state switching signal may be detected when in the first state, the battery level of the portable terminal is low, the load of CPU is lower than a threshold, or the first system platform does not perform any other operation except the presentation of the file. Alternatively, switching to the second state may be made upon receiving a switching command from a user. For example, in the first state, the user may press a switching button provided on the portable terminal to issue the switching command. As another example, switching to the second state may be made upon detecting a trigger signal indicating separation between the first and the second system platforms.

After switching to the second state, the second system platform may continue presenting the file. As an example, the first system platform presents an image in the first state; and after switching to the second state, the second system platform may continue the presentation of the image. For a media file, in order to achieve continuousness of file presentation and improved user experience, during switching to the second state, the first system platform may transmit information about current time progress of presentation of the file to the second system platform, and then the second system platform may continue presenting the file according to the time progress indicated in the received information.

Figure 2:
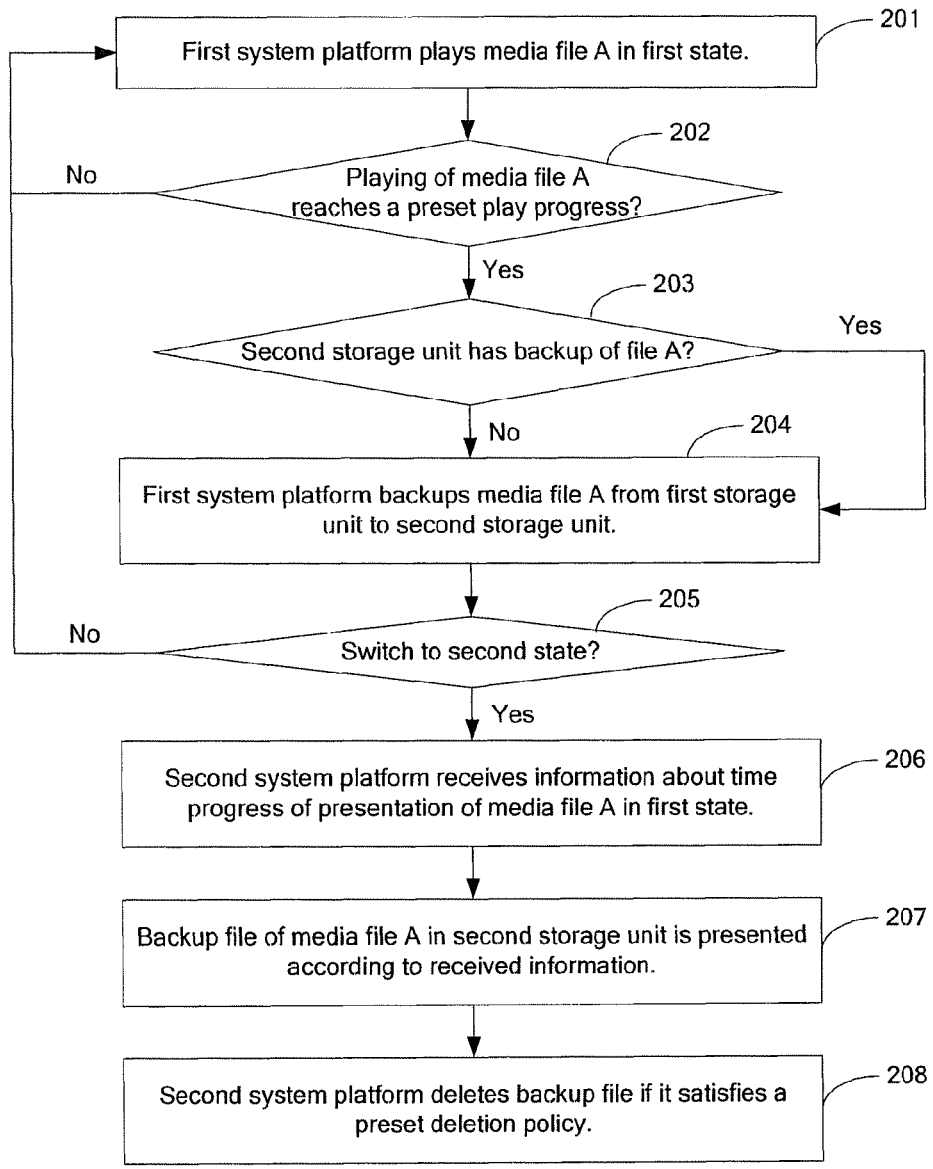
FIG. 2 is a flowchart illustrating a second embodiment of a method for presenting a file upon switching between system states according to the present application.

Reference is now made to FIG. 2, which is a flowchart illustrating a second embodiment of the method for presenting a file upon switching between system states according to the present application. In this embodiment, the first system platform includes a first storage unit, and the second system platform includes a second storage unit. The following description is given taking as an example a scenario of playing a media file.

At step 201, the first system platform plays a media file A in the first state.

While playing the media file A, the first system platform may gather information about the playing of the media file A, by using a multimedia plug-in module. The information may include a current play position, a play status, a name of the file being played and/or a playlist.

At step 202, the first system platform detects whether the media file A satisfies a preset playing progress. If so, the flow proceeds to step 203; otherwise the flow returns to step 201.

The playing progress may be preset, so that the first system platform may backup the media file A for the second system platform at an appropriate time prior to a state switching. In this way, it may be ensured that, upon switching to the second state, the second system platform can play the media file A in a seamless manner. Herein, the preset playing progress can be a playing progress of 10% of the whole playing length of the media file A.

It is to be noted that this step is optional. That is, the flow may directly proceed to step 203 for determining whether to backup the media file A, without determining whether the preset playing progress is satisfied or not.

At step 203, the first system platform determines whether the second storage unit has a backup of the media file A. If so, the flow proceeds to step 205; otherwise the flow returns to step 204.

In the case that the first system platform is in progress of playing the media file A, if it is not the first time to switch from the first state to the second state, the operation of backup of the media file A may have been carried out previously. Thus, in order to avoid redundant backups, it may be determined in advance whether the second storage unit of the second system platform already has a backup of the media file A.

It is to be noted that this step is also optional. That is, the flow may directly perform the backup operation without determining whether the second storage unit already has a backup of the media file A or not.

For determining whether the second storage unit already has a backup of the media file A or not, a MD5 check approach can be utilized to compare the file name of the media file A with the file name of the file already saved in the second storage unit, so as to check whether the media file A has been backuped.

At step 204, the first system platform backups the media file A from the first storage unit to the second storage unit.

The first system platform may backup the media file A from the first storage unit to the second storage unit via a communication interface between the first and the second system platforms.

At step 205, it is determined whether to switch to the second state. If so, the flow proceeds with step 206; otherwise the flow returns to step 201.

Here, switching to the second state may be made upon detecting a state switching signal. For example, such state switching signal may be detected when in the first state, it is detected that the battery level of the portable terminal is low, the load of CPU is lower than a threshold, or the first system platform does not perform any other operation except the presentation of the file. Alternatively, switching to the second state may be made receiving a switching command issued by a user. For example, in the first state, the user may press a switching button provided on the portable terminal to issue such switching command. As another example, switching to the second state may be made upon detecting a trigger signal indicating separation between the first and the second system platforms.

At step 206, the second system platform receives information about time progress of presentation of the media file A in the first state.

When the portable terminal is switched to the second state in which the media file A is presented by the second system platform, it may be required to play the media file A in continuity with its playing progress on the first system platform, so as to achieve a seamless play of the media file A during state switching. Thus, upon switching to the second state, the first system platform transmits information about current time progress of presentation of the media file A to the second system platform, which contains information about playing progress or status.

At step 207, the backuped media file A in the second storage unit is presented according to the received information.

It is to be noted that, when the first system platform is playing the media file A, the system hardware components in the portable terminal which are shared by the first and the second system platforms, such as a shared video output unit, a shared audio output unit or a shared keyboard/mouse, are all controlled by the first system platform to facilitate the play of the media file A. After switching to the second state, these system hardware components are also switched to be controlled by the second system platform. If the first system platform being playing the media file A uses a hardware component which is not shared with the second system platform, such as a touchpad, such unshared hardware component will not be controlled by the second system platform after switching to the second state.

At step 208, the second system platform deletes the backup file of the media file A if the backup file satisfies a preset deletion policy. Then the flow of the method ends.

For a portable terminal, its second system platform generally has a fixed amount of storage space. In order to release the storage space for further use, a deletion policy can be set in advance. For example, a backup of a media file can be deleted from the storage unit of the second system platform, if playing of the backup file has been finished, but the portable terminal does not yet switch its state. Alternatively, if a media file occupies more than 70% of the total storage space, parts of the media file can be removed one by one according to its playing progress, for example, the removal may be sequential, beginning with the start part of the media file.

In addition, in the second state, the first system platform can delete the media file form the first storage unit, as at this time the second system platform already has a backup of the media file, and removal of the media file from the first system platform will not result in loss of the media file.

Figure 3:
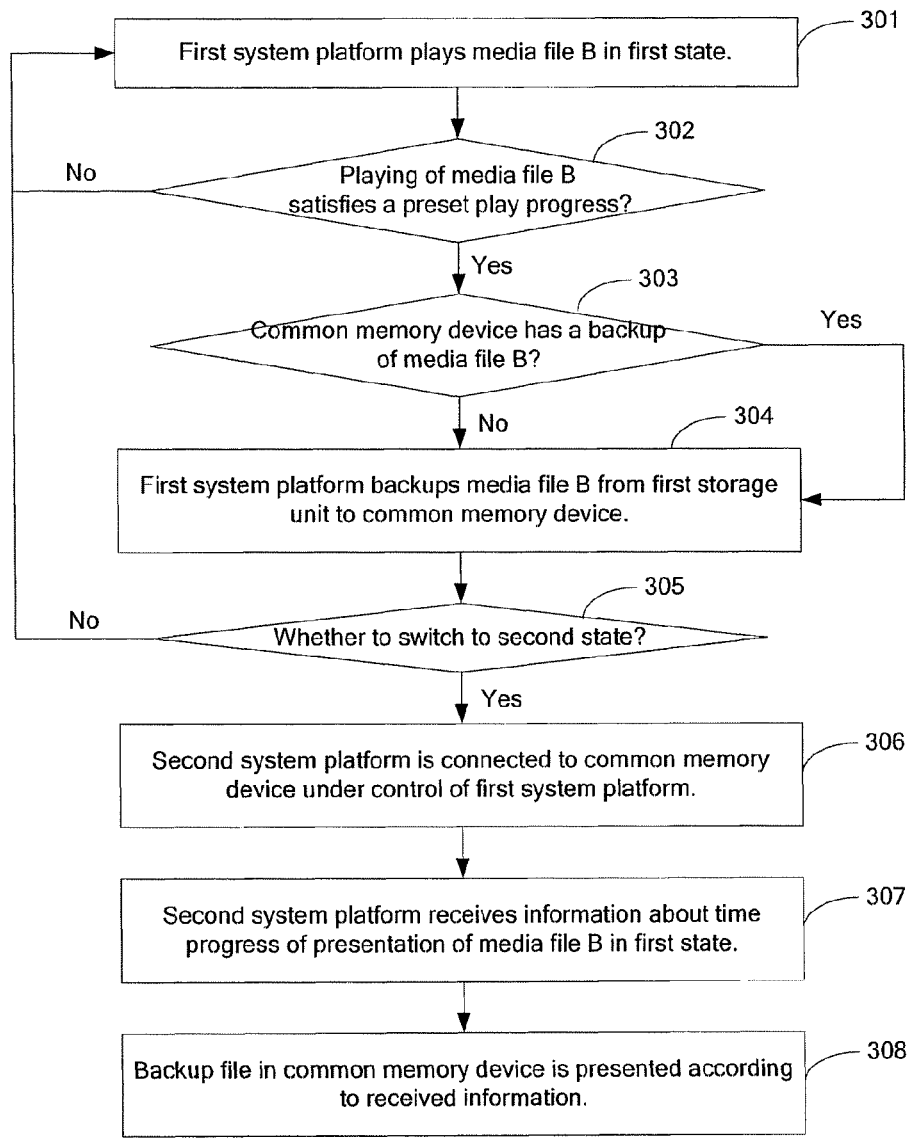
FIG. 3 is a flowchart illustrating a third embodiment of a method for presenting a file upon switching between system states according to the present application.

Reference is now made to FIG. 3, which is a flowchart illustrating a third embodiment of the method for presenting a file upon switching between system states according to the present application. In this embodiment, the first system platform includes a first storage unit, and the portable terminal further includes a common memory device shared between the first and the second system platforms. The common memory device is used by the first system platform in the first state and by the second system platform in the second state. Again, the following description is given with respect to a scenario of playing a media file.

At step 301, the first system platform plays a media file B in the first state.

While playing the media file B, the first system platform may gather information about playing of the media file B using a multimedia plug-in module. The information may include a current play position, a play status, a name of the file being played and/or a playlist.

At step 302, the first system platform detects whether the playing of the media file B satisfies a preset play progress. If so, the flow proceeds with step 303; otherwise the flow returns to step 301.

The playing progress may be preset, so that the first system platform may backup the media file B for the second system platform at an appropriate time prior to state switching. In this way, it can be ensured that, after switching to the second state, the second system platform can play the media file B seamlessly. Here, the preset play progress may be playing progress of 10% for the media file B.

It is to be noted that this step is optional. That is, the flow may directly proceed with step 303 for determining whether to backup the media file B, without determining whether the preset play progress is reached or not.

At step 303, the first system platform determines whether the common memory device stores a backup file of the media file B. If so, the flow proceeds with step 305; otherwise the flow returns to step 304.

When the first system platform is playing the media file B, if it is not the first time to switch from the first state to the second state, the operation of backup of the media file B may have been carried out previously. Thus, in order to avoid redundant backups, it can be determined in advance whether the common memory device already has a backup file of the media file A.

It is to be noted that this step is also optional. That is, the flow may directly perform the backup operation without determining whether the common memory device already has a backup of the media file B or not.

For determining whether the common memory device has a backup of the media file B or not, a MD5 check approach can be utilized to compare the file name of the media file B with the file name of the file already saved in the common memory device, so as to check whether the media file B has been backuped.

At step 304, the first system platform backups the media file A from the first storage unit to the common memory device.

At step 305, it is determined whether to switch to the second state. If so, the flow proceeds with step 306; otherwise the flow returns to step 301.

Here, switching to the second state may be made upon detecting a state switching signal. For example, such state switching signal may be detected when in the first state, it is detected that the battery level of the portable terminal is low, the load of CPU is lower than a threshold, or the first system platform does not perform any other operation except the presentation of the file. Alternatively, switching to the second state may be made receiving a switching command issued by a user. For example, in the first state, the user may press a switching button provided on the portable terminal to issue such switching command. As another example, switching to the second state may be made upon detecting a trigger signal indicating separation between the first and the second system platforms.

At step 306, the second system platform is connected to the common memory device under control of the first system platform.

In the first state, the common memory device is connected with the first system platform. Upon receiving a command for switching to the second state, the first system platform transmits a disconnection command to the common memory device and, at the same time, transmits a control command to the second system platform for connecting to the common memory device, such that the second system platform may be connected to the common memory device.

At step 307, the second system platform receives information about time progress of presentation of the media file B in the first state.

When the portable terminal is switched to the second state in which the media file B is presented by the second system platform, it may be desired to play the media file B in continuity with its play progress on the first system platform, so as to achieve a seamless playing of the media file B during state switching. Thus, upon switching to the second state, the first system platform transmits information about current time progress of presentation of the media file B to the second system platform, which may contain information about playing progress or status.

At step 308, the backup file of the media file B in the common memory device is presented according to the received information, and then the flow ends.

It is to be noted that, when the first system platform is playing the media file B, the system hardware components in the portable terminal which are shared by the first and the second system platforms, such as a shared video output unit, a shared audio output unit or a shared keyboard/mouse, are all controlled by the first system platform to facilitate the play of the media file B. After switching to the second state, these system hardware components are also switched to be controlled by the second system platform. If the first system platform being playing the media file B uses a hardware component which is not shared with the second system platform, such as a touchpad, such unshared hardware component will not be controlled by the second system platform after switching to the second state.

Additionally, in an embodiment of the portable terminal in which the main body part and the display screen part can be physically separated, the common memory device can be connected with the first and the second storage units simultaneously and provided on the second system platform (i.e., the display screen part). When the main body part is separated from the display screen part, the portable terminal is switched to the second state. In this case, the display screen part where the second system platform is located along with the common memory device is separated from the main body part. Then, the display screen part itself may continues presenting a file independently.

Embodiments of the portable terminal are also provided corresponding to the embodiments of the method for presenting a file upon switching between system states according to the present application.

Figure 4:
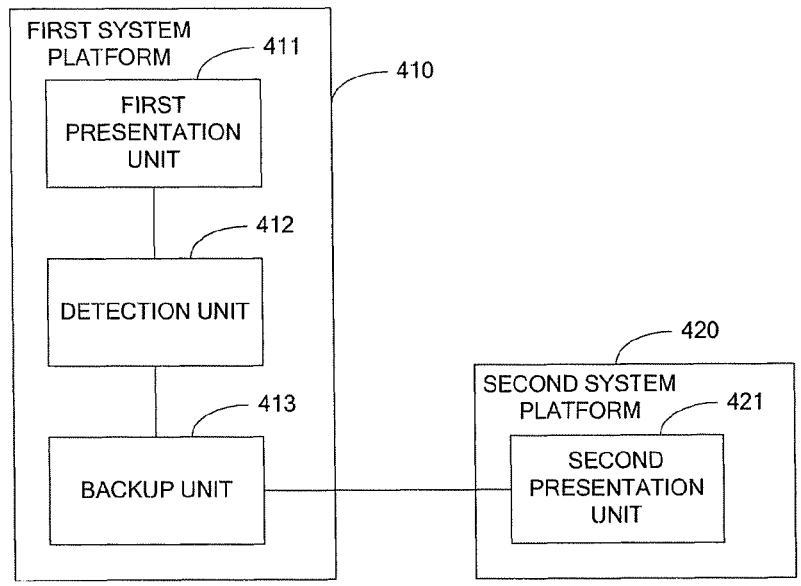
FIG. 4 is a block diagram of a first embodiment of a portable terminal according to the present application.

Reference is now made to FIG. 4, which is a block diagram of the first embodiment of the portable terminal according to the present application. The portable terminal includes a first system platform 410 and a second system platform 420.

The first system platform 410 includes a first presentation unit 411 configured to present a file in the first state, a detection unit 412 configured to detect whether a status of the file satisfies a preset condition, and a backup unit 413 configured to backup the file for the second system platform.

The second system platform 420 includes a second presentation unit 421 configured to continue presenting the file based on the backup file upon switching to the second state.

Figure 5:
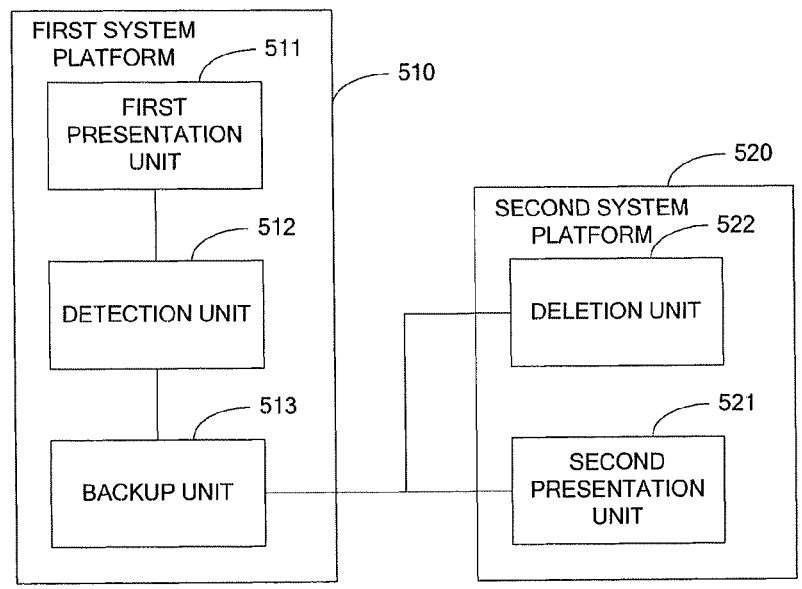
FIG. 5 is a block diagram of a second embodiment of a portable terminal according to the present application.

Reference is now made to FIG. 5, which is a block diagram of the second embodiment of the portable terminal according to the present application. The portable terminal includes a first system platform 510 and a second system platform 520.

The first system platform 510 includes a first presentation unit 511 configured to present a file in the first state, a detection unit 512 configured to detect whether a status of the file satisfies a preset condition, and a backup unit 513 configured to backup the file for the second system platform.

The second system platform 520 includes a second presentation unit 521 configured to continue presenting the file based on the backup file after switching to the second state, and a deletion unit 522 configured to delete the backup file if the backup file satisfies a preset deletion policy In particular, the first system platform 510 further includes a first storage unit and the second system platform 520 further includes a second storage unit. The backup unit 513 may include a backup determination unit (not shown) configured to determine whether the second storage unit already has a backup of the file, and a file backup unit (not shown) configured to backup the file from the first storage unit to the second storage unit if it is determined by the backup determination unit that the second storage unit does not have a backup of the file. The second presentation unit 521 may include a progress reception unit (not shown) configured to receive information on time progress of presentation of the file in the first state, and a file presentation unit (not shown) configured to present the backup file in the second storage unit according to the time progress indicated in the information received by the progress reception unit.

In particular, the first system platform 510 may include a first storage unit, and the portable terminal can further include a common memory device shared by the first 510 and the second 520 system platforms. The common memory device is used by the first system platform 510 in the first state and by the second system platform 520 in the second state. The backup unit may include a backup determination unit (not shown) configured to determine whether the file is stored in the common memory device, and a file backup unit (not shown) configured to backup the file from the first storage unit to the common memory device if it is determined by the backup determination unit that the common memory device does not have a backup file of the file. The second presentation unit 521 may include a connection unit (not shown) configured to connect the second system platform to the common memory device under the control of the first system platform, a progress reception unit (not shown) configured to receive information about time progress of presentation of the file in the first state, and a file presentation unit (not shown) configured to present the backup file in the common memory device according to the time progress indicated in the information received by the progress reception unit.

It can be seen from the above description of the embodiments that, in the first state in which the file is presented by the first system platform, if it is detected that the status of the file satisfies a preset condition, the first system platform backups the file for the second system platform. When the portable terminal is switched to the second state in which the file is presented by the second system platform, the second system platform continues presenting the file based on the backup file. With the portable terminal of hybrid system architecture according to the embodiments of the present invention, if the system state is switched while a file is being played, the switched-to system can continue presenting the file based on the backup file, according to presentation progress of the file before the system switching. In this way, it is possible to achieve a seamless presentation of the file before and after the switching, and user's experience of using the portable terminal can be improved. According to the embodiments of the present application, the presented file is backuped prior to the switching, thereby saving the time for backuping the file during the switching. In particular, for a portable terminal in which the main body part and the display screen part can be separated (i.e., the first system platform and the second system platform can be physically separated), the file backup operation prior to the switching can overcome disadvantages that the file cannot be backuped or can only be backuped wirelessly at a low data rate after the separation. In this way, user's requirement of continuously viewing a document file or a media file in any state can be satisfied.

It can be appreciated by those skilled in the art that the techniques according to the embodiments of the present application can be implemented in software in combination with a necessary general purpose hardware platform. In view of this, the technical solutions according to the embodiments of the present application, or a part thereof which makes contribution over the prior art, can be substantially embodied in a form of software product. The computer software product can be stored in a storage media, such as ROM/RAM, magnetic disk, optical disc and the like, containing instructions which cause a computer (which can be a personal computer, a server, a network device or the like) to perform one or more methods according to the embodiments of the present application or particular parts thereof.

The embodiments in the specification are described, and the same or similar elements of the respective embodiments may refer to each other. The description of any embodiment focuses on differences compared with other embodiments. The embodiments of the devices and terminals and the embodiments of the corresponding method may refer to each other, so as to omit unwanted duplicated description.

The embodiments of the present application as described above do not limit the scope of the present application which should encompass all variations, equivalents and modifications that come within the principle and spirit of the present application.

What is claimed is:

1. A method for executing a file upon switching between system states in a portable terminal, the portable terminal comprising a first system platform and a second system platform, a state in which the execution of the file is controlled by the first system platform being a first state, and a state in which the execution of the file is controlled by the second system platform being a second state, the method comprising:

detecting, by the first system platform in the first state, whether the file being executed by the first system platform has been executed for a time period not less than a preset time period or whether a backup label indicative of a backup operation is preset for the file;

backuping, by the first system platform, the file to obtain a backup file for the second system platform, only if the file has been executed for a time period not less than the preset time period or a backup label is preset for the file; and switching to the second state, and continuing, by the second system platform, the execution of the file based on the backup file.

2. The method according to claim 1, wherein the switching to the second state comprises:

switching to the second state upon detecting a state switch signal; or switching to the second state upon receiving a switch command issued by a user; or switching to the second state upon detecting a trigger signal indicating separation of the first and the second system platforms.

3. The method according to claim 1, wherein the first system platform comprises a first storage unit, and the second system platform comprises a second storage unit, and wherein the first system platform backuping the file to obtain a backup file for the second system platform comprises:

determining, by the first system platform, whether the second storage unit already has the backup file of the file; and backuping, by the first system platform, the file from the first storage unit to the second storage unit, if it is determined that the second storage unit does not have a backup file of the file.

4. The method according to claim 3, wherein the second system platform continuing the execution of the file based on the backup file comprises:

receiving, by the second system platform, information about time progress of execution of the file in the first state; and executing the backup file in the second storage unit according to the time progress indicated in the received information.

5. The method according to claim 1, wherein the first system platform comprises a first storage unit, the portable terminal further comprises a common memory device shared by the first and the second system platforms, the common memory device being used by the first system platform in the first state and by the second system platform in the second state, and wherein the first system platform backuping the file to obtain the backup file for the second system platform comprises:

determining, by the first system platform, whether the file is stored in the common memory device; and backuping the file from the first storage unit to the common memory device if it is determined that the file is not stored in the common memory device.

6. The method according to claim 5, wherein the second system platform continuing the execution of the file based on the backup file comprises:

connecting the second system platform to the common memory device under control of the first system platform;

receiving, by the second system platform, information about time progress of execution of the file in the first state; and executing the backup file in the common memory device according to the time progress indicated in the received information.

7. The method of claim 1, further comprising, after the second system platform continuing the execution of the file based on the backup file:
deleting, by the second system platform, the backup file if the backup file satisfies a preset deletion policy.

8. A portable terminal, comprising a first system platform and a second system platform, wherein
the first system platform comprises:
a first execution unit configured to execute a file in a first state in which the execution of the file is controlled by first system platform;
a detection unit configured to detect whether the file being executed by the first execution unit has been executed for a time period not less than a preset time period or whether a backup label is preset for the file; and
a backup unit configured to backup the file to obtain a backup file for the second system platform, only if the file has been executed for a time period not less than the preset time period or a backup label indicative of a backup operation is preset for the file; and
the second system platform comprises:
a second execution unit configured to continue the execution of the file based on the backup file, upon switching to a second state in which the execution of the file is controlled by the second system platform.

9. The portable terminal according to claim 8, wherein the first system platform comprises a first storage unit, and the second system platform comprises a second storage unit, and wherein the backup unit comprises:
a backup determination unit configured to determine whether the second storage unit has the backup file of the file; and
a file backup unit configured to backup the file from the first storage unit to the second storage unit, if the backup determination unit determines that the second storage unit does not have the backup file of the file.

10. The portable terminal according to claim 9, wherein the second execution unit comprises:
a progress reception unit configured to receive information about time progress of execution of the file in the first state; and
a file execution unit configured to execute the backup file in the second storage unit according to the time progress indicated in the information received by the progress reception unit.

11. The portable terminal according to claim 8, wherein the first system platform comprises a first storage unit, the portable terminal further comprises a common memory device shared by the first and the second system platforms, the common memory device is used by the first system platform in the first state and by the second system platform in the second state, and wherein the backup unit comprises:
a backup determination unit configured to determine whether the file is stored in the common memory device; and
a file backup unit configured to backup the file from the first storage unit to the common memory device if the backup determination unit determines that the file is not stored in the common memory device.

12. The portable terminal according to claim 11, wherein the second execution unit comprises:
a connection unit configured to connect the second system platform to the common memory device under control of the first system platform;
a progress reception unit configured to receive information about time progress of execution of the file in the first state; and
a file execution unit configured to execute the backup file in the common memory device according to the time progress indicated in the information received by the progress reception unit.

13. The portable unit according to claim 8, wherein the second system platform further comprises:
a deletion unit configured to delete the backup file if the backup file satisfies a preset deletion policy.

* * * * *